May 2, 1961  L. EMANUELI ET AL  2,982,328
PNEUMATIC TIRES

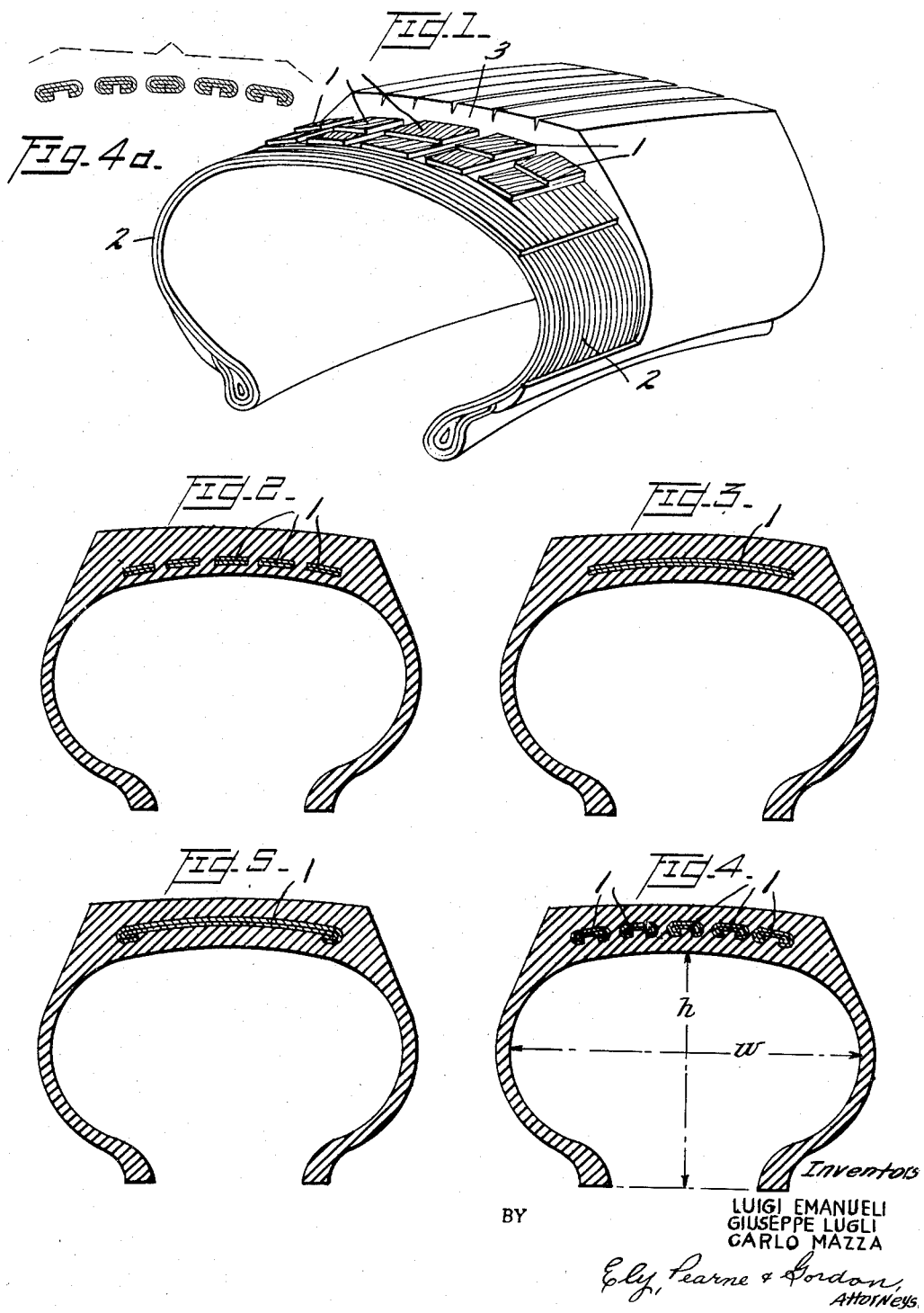

Filed Dec. 10, 1956  4 Sheets-Sheet 2

INVENTORS
LUIGI EMANUELI
GIUSEPPE LUGLI
CARLO MAZZA
BY
Ely, Pearne & Gordon
ATTORNEYS May 2, 1961 L. EMANUELI ET AL 2,982,328
PNEUMATIC TIRES Filed Dec. 10, 1956 4 Sheets-Sheet 3

INVENTORS
LUIGI EMANUELI
GIUSEPPE LUGLI
CARLO MAZZA
BY
*Ely, Pearne & Gordon*

ATTORNEYS

United States Patent Office 2,982,328
Patented May 2, 1961

2,982,328
PNEUMATIC TIRES

Luigi Emanueli, Giuseppe Lugli, and Carlo Mazza, Milan, Italy, assignors to Pirelli Societa per Azioni, Milan, Italy, a corporation of Italy Filed Dec. 10, 1956, Ser. No. 627,468

Claims priority, application Italy Mar. 21, 1951

25 Claims. (Cl. 152—361)

This invention relates to improvements in pneumatic vehicle tire casings. This application is a continuation-in-part of our co-pending applications for "Pneumatic Tire Castings," Serial No. 274,085, filed February 29, 1952, now abandoned; for "Pneumatic Vehicle Wheel Casing," Serial No. 316,356, filed October 23, 1952, now abandoned; for "Pneumatic Road Wheel Tires," Serial No. 439,791, filed June 28, 1954, now abandoned; for "Belting Breaker for Pneumatic Tire," Serial No. 555,713, filed December 27, 1955, now Patent No. 2,945,525, July 19, 1960; and for "Improved Belting Structures for Pneumatic Tires and Method of Making Same," Serial No. 568,665, filed February 29, 1956, now abandoned.

Various goals have been long sought by tire engineers, such as increased tread wear, lowered power loss, greater dirigibility (steering), softer riding qualities, lower heat generation, and the like. But, heretofore, the improvement of one of these qualities has always resulted in decrease of at least one of the others. Thus, for example, it has long been the dream of tire engineers to build a tire with so-called radial cords, i.e., cords in the carcass of the tire which lay substantially in planes radiating from the axis of rotation. With such radial cords, it was realized that the maximum tensile strength of the cords would be utilized, whereby thinner sidewalls could be used and, consequently, softer riding qualities and lower heat generation in the sidewalls would be obtained. Unfortunately, any tire built with only radial cords in the casing or the sidewalls heretofore suffered almost complete loss of dirigibility and was completely unstable during running; it would wobble, and a car equipped with such tires was practically uncontrollable above very low speeds. Further, tread wear substantially increased and power losses increased. Thus, heretofore the art has always had to employ, in any commercial tire, some type of expedient to stabilize the tire. The customary expedient has been to provide casings in which the cords of the fabric were at a bias, that is, which lay at an acute angle to the equatorial plane of the tire, usually at 45°, although variations from 30° to 60° were known. By crossing the cords in alternate plies of the casing at such acute angles, the casings were stabilized and the essential dirigibility was attained but with a recognized loss in utilization of the tensile strength of the cords.

Tread wear has been increased by improving the compounding of the tread stock. But for a given stock, tread wear has been extremely sensitive to inflation; any substantial reduction in inflation to improve riding quality of a conventional tire has always drastically increased tread wear; thus, tread wear and soft riding properties have heretofore been practically antithetical properties. Power consumption in driving pneumatically tired wheels has also been relatively antithetical to tire softness.

Another problem which has confronted tire engineers has been that of reducing the so-called slip angle, that is, the angle which the equator of the integer of the tire tread in contact with the ground will assume with respect to the equatorial plane of the rim when a given turning or cornering force is applied to the wheel. Tires with a high slip angle are relatively difficult to steer, and the slip angle factor is evidenced by the tendency of the tires to squeal when a corner is turned at high speed. This squeal not only signifies steering difficulties but also rapid tread wear due to transverse abrasion of the tread. The usual remedy for a tire having high slip angle characteristics has been to stiffen the carcass and/or overinflate, all at a loss of riding comfort.

It is an object and an advantage of this invention that, without modifying the tread stock but simply by a novel construction, an increased tread life is provided (in the order of a 100% to 200% increase) over that of a tire of standard construction. Another object is to reduce power consumption and decrease the slip angle. Instead of obtaining these advantages at a decrease in riding comfort, it is a further advantage of this invention that they may be obtained without an increase in inflation pressures normally used in tires of standard construction. In fact, with equal inflation pressures, riding comfort is increased because thin, flexible sidewalls may be employed. It is not only possible by this invention to employ radial cords in the sidewalls, but, in the preferred forms of this invention, radial carcass cords are, indeed, employed.

The above advantages are obtained essentially by employing an unconventional cross-section in a carcass having relatively thin, flexible sidewalls and, outside the carcass and relatively independent thereof, a substantially cylindrical cincture belt which, under inflation, maintains and supports the tread in a substantially flat condition. In the prior co-pending parent applications, this belt construction has been referred to as a "breaker belt" or "breaker belt structure" and may be so referred to in the appended claims. In order to distinguish this structure from conventional breaker strips and to give a better expression of the stricture effected by it, it will be referred to in the balance of this specification as a "cincture" or "cincture belt."

Other and further objects and advantages of this invention and the means of obtaining them will become apparent from the following detailed specification disclosing preferred embodiments, the appended claims, and the accompanying drawings, in which:

Figure 1 is a broken-away section of a tire made according to the invention.

Figure 2 is a diagrammatic cross-section of the tire of Figure 1, showing the orientation of the cincture elements.

Figure 3 is similar to Figure 2 but shows a different cincture belt.

Figure 4 is similar to Figures 2 and 3, showing modified cincture elements.

Figure 4a is a diagrammatic transverse cross-sectional view showing the cincture elements only of Figure 4 in a further modified form.

Figure 5 is similar to Figure 3, but showing a modified cincture belt.

Figure 6:
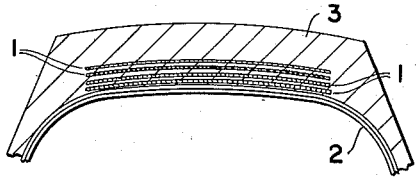
Figure 6 is similar to Figure 5, showing a further modification.

In explaining the various embodiments of the invention illustrated in the drawings, the plane of reference, termed the equatorial plane, is the plane perpendicular to the rotational axis of the tire and passing through the mid-point of the width of the tire.

As shown in Figure 1, the carcass 2 of the tire is comprised of two plies of cord fabric secured to and joining conventional beads. The interior of the carcass may have a ply of butyl and/or sealant, if the tire is to be employed as a tubeless tire, or, if a tube is to be used, the interior may be conventional and have suitable chafer strips, if desired, although, because of the extreme flexibility of the sidewalls, particularly with the two-ply structure shown, the beads may be stiffened to reduce bead wear. The exterior of the sidewalls is covered with suitable sidewall stock which fairs into the stock of the tread 3. The tread stock is composed of a rubber compound having a high modulus, as described in parent application Serial No. 439,791, now abandoned.

The cords for the carcass and/or for the cincture exhibit low elongation under loads less than their rupture loads and therefore, may be of nylon, high tensile rayon, cotton, flax or even metal. The above cords are rubberized with a rubber compound having a low modulus as set forth in the aforementioned parent application Serial No. 439,791.

As indicated diagrammatically in Fig. 1, the parallel cords in layers or plies of the carcass 2 are radial. That is, in running from bead to bead, the cords, particularly in the sidewall portions, lie in planes which radiate from the rotational axis and are substantially perpendicular to the equatorial plane of the tire. The cords may not extend at a true perpendicular to the equatorial plane. But the cords should not be at an angle less than 80° to said plane, in order to obtain optimum advantage of the tensile strength of the cords and thereby permit the use of highly flexible, thin, cool-running sidewalls obtainable under this invention. The angle at which the carcass cords are set to the equatorial plane depends upon several factors, a principal one being the elongation characteristics of the cords and the degree of expansion of the tire carcass effected when it is cured in the vulcanizing mold. It is necessary for good molding that the uncured carcass be built slightly smaller than the tire mold cavity. Expansion of the carcass cavity under internal pressure during molding is necessary not only to insure that the tread and sidewall cover stock is forced into all the mold cavities; such tension during cure corrects any waviness which may have been imparted to the cord fabric as it was laid up in the tire building operation by pulling the cords into substantial parallelism with each other and, thereby, insuring a more even distribution of the load among the cords during use of the tire. If the cords in the carcass plies are substantially incapable of elongation at less than rupture loads, kinks or waviness, or similar expedients may be employed to give the cords enough length to permit the casing to expand during cure. Few cords have zero elongations and the general practice is to vary the lay of the cords from a line perpendicular to the equatorial plane according to the elongation characteristics of the cords. That is, a cord having relatively higher elongation can be laid more closely to a true perpendicular than a cord of relatively lower elongation. In short, when the cords possess insufficient elongation characteristics to permit proper expansion of the casing during cure, this insufficiency can usually be compensated for by increasing the departure from a true perpendicular to the equatorial plane. But this departure should not exceed 10°, as pointed out above. To the extent that parallel cords in one carcass ply depart from a true perpendicular, the cords in an adjacent ply will usually likewise depart, but at the supplement to the angle of the first ply. Thus, the maximum angularity between parallel cords in adjacent plies will be 20° and is usually less. With such small permissible departures from a true perpendicular, however, all cords are substantially radial.

As will be noted in all the embodiments shown in Figures 1-7, a common characteristic of the cross-section of each tire casing is that the internal cross-sectional height of the casing from the bead to the tread-supporting portion (dimension $h$ in Figure 4) is less than the width between the sidewall portions (dimension $w$ in Figure 4). In fact, it is a customary characteristic of this invention that the ration $h/w$ be less than one. In practice, the preferred ration of $h/w$ may vary from .3 to .8. The significance of this ratio will be explained in greater detail following the description of the cincture structure.

As will be noted in Figures 1-7, one or more circumferential bands are incorporated between the carcass and the tread portion 3. These bands constitute the cincture structure essential to tires made according to this invention. Each band is comprised of at least a pair of superimposed layers or plies of rubberized textile cords, as in the plies of the casing 2, with this significant difference: whereas, in the casing plies, the cords preferably, but nonetheless optionally, have relatively low elongation characteristics at loads less than rupture loads, the cords in the cincture band plies are necessarily of relatively low elongation. The cords in each cincture ply are parallel to each other and approach parallelism with the equatorial plane of the tire, but, to the extent that the cords in one ply depart from such parallelism to the equatorial plane, the cords in an adjacent ply of a pair of cincture plies depart from parallelism at substantially the same angle but in an opposite, i.e., divergent, direction. The maximum angle at which the cords in any one ply can extend with respect to the equatorial plane is 20°, and in practice the angle is usually and preferably less than 10°. Thus, the maximum angle of divergence between the cords of adjacent cincture plies is 40° and is preferably less than 20°. In practice, because of difficulties in cutting, the necessary elongation resulting from expansion of the carcass during cure, and similar practical requirements, a practical minimum angle of the cincture cords to the equatorial plane has been found to be 5°, i.e., substantially parallel for all practical purpose. However, it is possible, by using expedients described hereinafter to have the angle of the cincture cords to the equatorial plane diminish to zero. Thus, in the appended claims, where the cincture cords are defined as being at an angle of less than 20° (or less than 10°) to the equatorial plane, such terms are to be understood to mean and include angles which diminish to and include 0°. Further, it is to be understood that, under such circumstances of 0° angularity to the equatorial plane, the oppositeness of direction of cords in adjacent plies as may be called for in such claims will likewise diminish to zero, and all cords in adjacent plies will be substantially parallel to each other and the equatorial plane.

In laying up the band or bands constituting the cincture structure, expansion of the casing during cure must be allowed for. If any slack is provided in the bands during the tire building operation, any such slack should be substantially taken up during the cure. Indeed, this is one of the reasons it is preferred that at least some angle of the cincture cords to the equatorial plane exist at the time the casing is vulcanized; such angularity will permit some elongation of the bands during the expansion of curing if the elongation of the cords should be exceeded.

As will be noted in Figures 1–7, a common characteristic of all embodiments is that the cincture structure is relatively flat in cross-section, i.e., as a whole the cincture structure is substantially cylindrical and concentric with the axis of rotation of the tire: And it is because of the substantially cylindrical configuration of the cincture structure that the casing 2 possesses its unconventional cross-section, being quite flat beneath the tread 3, rather than having the more conventional circular or horseshoe-shaped cross section. In fact, in a tire made according to the invention, the cylindrical configuration of the cincture may be said to be the primary and determining influence upon the configuration of the other portions of the tire, i.e., the tread, which the cincture supports, and the casing, which the cincture flattens and restricts.

As the support for the relatively flat tread, the cincture structure is substantially coextensive with, but not greater in width than, the width of the ground-contacting surface of the tread. As indicated in the drawings, the cincture may assume several forms. As shown in Figures 1 and 2, it may be made up of a plurality of relatively narrow bands located edge-to-edge and axially adjacent to each other across the width of the cincture structure which the bands make up. Or, as shown in Figure 3, the cincture may be comprised of a single plural-ply band. The bands in the cincture structure are not necessarily flat and unfolded across their full width. As shown in Figure 4, marginal portions of the plies in the band may be folded back against themselves, strengthening the edges of the bands. As shown in Figure 4a, the edges of each band (breaker belt) are folded back against the rest of the band so as to lie face-to-face thereagainst in such a manner that the ratio of the combined width of the two folds (formed by the folding of the edges) to the overall width of the folded band increases from band-to-band outwardly from the center band (belt). When a single band, rather than a plurality of bands, is used, the marginal portions of the plies of the band may likewise be folded back against the band to strengthen the edges, as shown in Figure 5. Nor is it necessary, if a plurality of bands are located in any given cross-section, that the bands be located axially with respect to each other. As shown in Figure 6, they may be located radially with respect to each other. The plurality of radially located bands in a given cross-section, as shown in Figure 6, may be achieved by employing concentric bands or by spirally winding a single band twice around the casing. Likewise, the plurality of axially located bands, as shown in Figures 1, 2, and 4, may be achieved by employing a plurality of parallel bands or by helically winding a single band a plurality of times.

It is not necessary that each ply in a band be fully coextensive axially across the band. Thus, in Figure 7, which is a diagrammatic view showing a particularly successful commercial embodiment of a tire made according to this invention, a plurality of concentrically located bands 1a and 1b are employed. Each band is formed by folding a single ply against itself, leaving one folded edge and two opposite single ply edges in each band, one of said single ply edges extending beyond the other. By locating the folded edges of the band 1a oppositely to the folded edge of band 1b, a convenient step-off construction is afforded, supporting the tread where it fairs off into the sidewalls. In addition to providing convenient step-offs or relatively feathered or skived edges for the cincture, another advantage of the "book" type of construction as shown in Figures 7 and 8 is that the formation of a plural-ply band by folding a single ply insures, as between the two plies of a pair formed by the fold, that whatever angularity may exist in the cords of one ply with respect to the equatorial plane will be duplicated by the cords in the other ply, but in a divergent or opposite direction.

Figure 7:
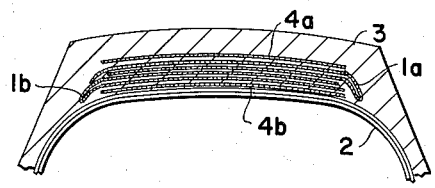
Figure 7 is a variation of the structure shown in Figure 6, but showing the use of conventional breaker strips in addition to the cincture belt structure.
Figure 8:
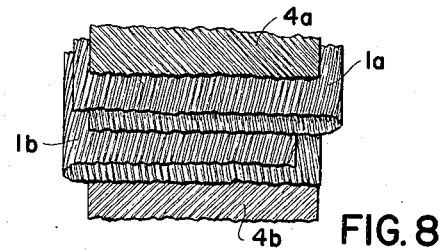
Figure 8 is a diagrammatic, broken-away plan view of the structure shown in Figure 7.

Figures 7 and 8 are also of interest in illustrating that the cincture bands employed in tires made according to this invention are not to be confused with conventional breaker strips of bias cord or square woven fabric and whose function is simply to carry localized impacts and shock loads from the tread and distribute them over the carcass or, conversely, to transfer the torque load from the casing to the tread. In fact, because the cincture structure is not and does not function as a part of the carcass, it has been found expedient in commercial embodiments of this tire to employ a breaker strip 4a, of conventional 45° bias cord fabric between the cincture band 1a and the tread and another similar breaker strip 4b between the carcass 2 and the cincture bands.

Figure 9:
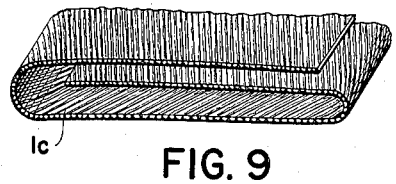
Figure 9 is a detail view of an arrangement for laying up the plies in a cincture belt structure alternative to that shown in Figs. 7 and 8, omitting the breaker strips.

The folding of the cincture cord fabric to obtain opposite angularity of layers in a band is not limited to that shown in Figures 7 and 8. For example, another procedure is to fold the margins of a strip of cincture cord fabric 1c toward the center of the strip, as shown in Fig. 9. In so folding, the margins preferably overlap to provide a reinforced center section in the band. If the thus folded strip is of single-ply material with the cords disposed at the angles described above, the overlaps of the margins will be parallel. But if the fabric itself is double ply with cords in adjacent plies at opposite angles, then such double-ply fabric folded as in Fig. 9 will set the cords in any ply at an opposite angularity to the cords in an adjacent ply.

Figure 10:
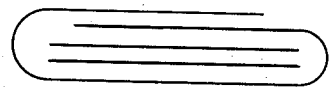
Figure 10 is a further modification of the alternative shown in Fig. 9, shown diagrammatically.

Still another expedient, by way of example, and not of limitation, is to include one or more reinforcing plies within the so folded fabric, as illustrated diagrammatically in Fig. 10.

Figure 11:
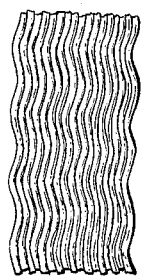
Fig. 11 is a detail view of a portion of a modified cincture belt cord fabric, prior to vulcanization.
Figure 12:
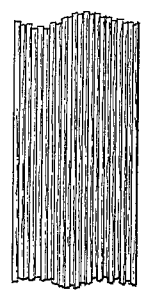
Fig. 12 is a detail view of the portion shown in Fig. 11, but subsequent to vulcanization.

As indicated above, normal handling and cutting procedures for cord fabrics make an angularity of 5° to the equatorial plane of the tire a practical minimum angle. However, there may be instances where it is desirable to have the cords parallel, or nearly so, to the equatorial plane. Further, to allow for the necessary expansion of the tire in the mold during vulcanization, it may be desirable to employ expedients which will permit the cincture belt to increase in circumference during the cure without overstraining the cords in the cincture. A manner of accomplishing either of these results is shown in Figs. 11 and 12. Prior to laying up the normally parallel cords in cincture belt layers, a waviness is purposely imparted to the cords, as shown in Fig. 11. When the tire body then expands in the mold during vulcanization, the cords are straightened out and assume a straight parallel relationship, as shown in Fig. 12 (or at least a more nearly straightened position). The degree of waviness desired in the cord (or cords) before curing may be calculated according to the increase in circumference of the band which is desired during cure. Although the percentage will vary, in most tires the increase in circumference of a band will not usually exceed four or five percent.

The wavy arrangement of adjacent cords in a single layer, as shown in Fig. 11, may be obtained by winding a single cord or a group of several parallel cords in the undulating or sinusoidal fashion either directly on the carcass or upon a drum from which the waved cords may be transferred to the carcass. This procedure has the advantage of providing a substantial saving in material while permitting the building of concentric bands or layers, each without an axially-extending joint or seam, as shown diagrammatically in Fig. 13. Or the cords or layers of cords may be spirally wound, as shown diagrammatically in Fig. 14.

Figure 20:
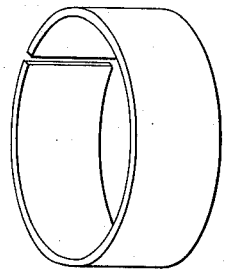
Fig. 20 is a partly diagrammatic view showing a joint in the ends of a concentric band.
Figure 21:
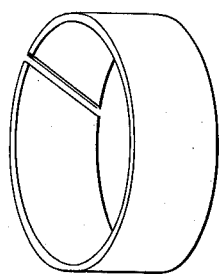
Fig. 21 is similar to Fig. 20 showing another type of joint.
Figure 22:
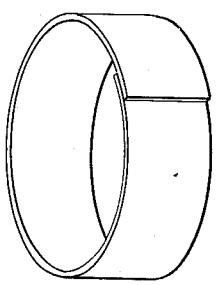
Fig. 22 is similar to Fig. 20 showing still another type of joint.

Because inflation of the tire places the cincture belt under circumferential tension load, as will be explained in more detail below, the problem of providing a suitable joint in band or layer presents practical difficulties which should be overcome. Thus, for a given band or layer, either a transverse axial butt joint, as shown in Fig. 20, or a skew butt joint, as shown in Fig. 21 will constitute a point of weakness under circumferential tension, especially if the abutting edges of the bands or layer may tend to be pulled apart by the expansion of the tire during vulcanization in the mold. An overlapped joint, as shown in Fig. 22, may provide sufficient tensile strength for the band or layer if the overlap is sufficient, but this type of joint may be undesirable due to the dynamic imbalance it may cause, which imbalance can become objectionable and damaging at high rotational speeds.

Figure 13:
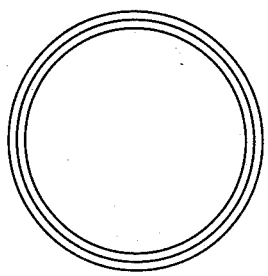
Fig. 13 is a diagrammatic view of an arrangement of bands or layers in the cincture belt where the bands or layers are arranged concentrically.
Figure 14:
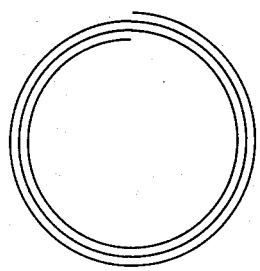
Fig. 14 is a diagrammatic view of an arrangement of a single band or layer in the cincture belt, arranged spirally to provide the effect of a plurality of bands or layers.
Figure 15:
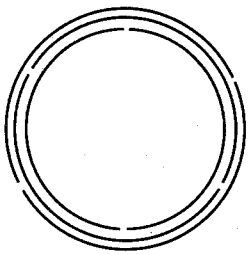
Fig. 15 is a diagrammatic view similar to Fig. 13, but showing the bands or layers in the cincture belt made from segmental lengths of belt fabric.
Figure 16:
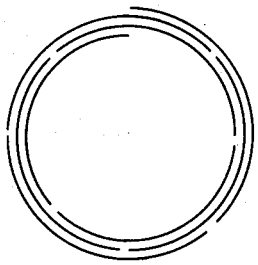
Fig. 16 is a diagrammatic view similar to Fig. 14, but showing the band or layer in the cincture belt made from segmental lengths of belt fabric.

If the cincture belt is not built as shown in Figs. 13 and 14, the use of a plurality of segmental lengths in a band or bands permits either of the joints shown in Figs. 20 or 21 to be employed without appreciably decreasing the circumferential tensile strength of the cincture. This result is accomplished, as indicated in Figs. 15 and 16, by laying on the layers or bands in segments, which may be less than a complete circumference, and then staggering the joints so that no pair of joints coincide at a given radius. If this procedure is followed, it is generally desirable, further, that the joints be in substantial dynamic balance, whether the segments are laid concentrically, as in Fig. 15 or spirally, as in Fig. 16.

Figure 17:
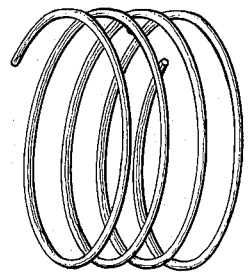
Fig. 17 is a diagrammatic view showing the cords or fabric strip in a band of a cincture belt arranged helically.
Figure 18:
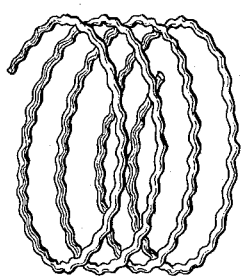
Fig. 18 is a view similar to Fig. 17, except that the cords or fabric strip are waved prior to vulcanization.

Another solution to the problem of avoiding weakness in circumferential tension is diagrammatically illustrated in Fig. 17. Where a plurality of axially-spaced concentric bands is desired, as indicated by the bands 1, in Fig. 1, these bands may be obtained by helically winding a single band across the width of the cincture structure. If the material of the helical band shown in Fig. 17 is not sufficiently elastic to permit the necessary expansion of the tire during cure, the band may be waved, as illustrated in Fig. 18. Fig. 18 also illustrates, diagrammatically, the manner in which a wavy cord or cords may be laid up to provide the orientation shown in Fig. 13.

Figure 19:
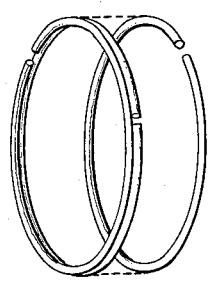
Fig. 19 is a view similar to Fig. 17, except that the cords or fabric strips are arranged concentrically in a band.

A still further solution to the problem of providing axially-spaced concentric bands in a cincture structure is to lay up the bands with butt joints, circumferentially offsetting the joints (preferably in dynamic balance), as indicated diagrammatically in Fig. 19.

In this connection it should also be noted that when the diagrammatic Figures 13, 14, 15, and 16 represent layers of cords in a band, the indication of an odd number of layers in a band is not to be understood to represent preferred practice when the cords in a layer deviate substantially from parallelism with the equatorial plane. Where the cords in a layer lie at any appreciable angle to the equatorial plane, preferred construction calls for an even number of layers in a band, with the cords in adjacent layers being divergently disposed with respect to the plane.

Having described various preferred embodiments and variations of this invention, the principles of operation may now be explained. When the cured tire is mounted on a wheel rim and inflated, the effect of the inflation pressure is to urge the tire to assume the conventional toroidal shape. But in a tire made according to this invention with an $h/w$ ratio (see Fig. 4) of less than one, such inflation pressure would tend to cause the cincture to assume a greater diameter and circumference than it possesses. Because the cincture is substantially inelastic and resistant to elongation, the effect of inflation pressure, therefore, is to place the cincture under considerable circumferential tension, which tension causes the cincture to maintain its substantially cylindrical shape, both axially and circumferentially. The tread, being supported by the cincture, therefore, tends to maintain a flat, cylindrical configuration under load. This is demonstrated by the fact that, under load, the tread of a tire made according to this invention provides a relatively rectangular "print," rather than the relatively elliptical print of conventional tires.

Figure 24:
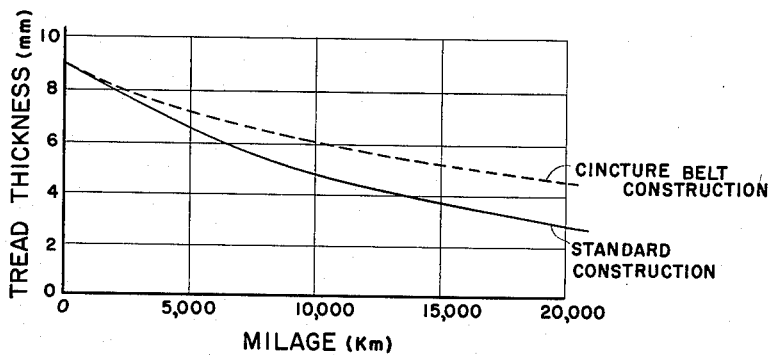
Fig. 24 is a curve illustrating the relative increase in tread wear obtainable with this invention.
Figure 25:
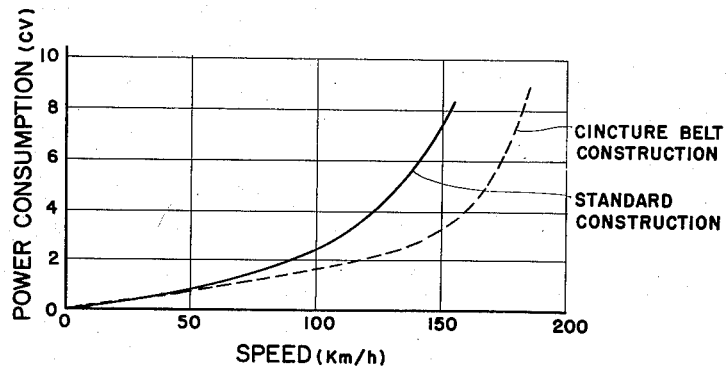
Fig. 25 is a curve illustrating the relative decrease in power consumption for a given speed, obtainable with this invention.
Figure 26:
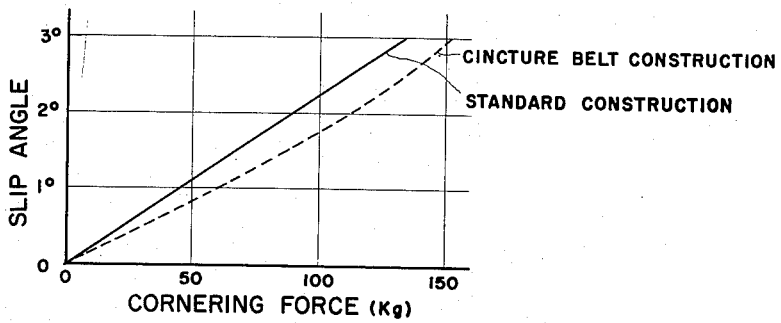
Fig. 26 is a curve illustrating the relative decrease in slip angle, for a given cornering force, obtainable with this invention.

The increase in mileage, decrease in power consumption, and decrease in slip angle obtained by a tire of this construction is quite surprising. The curves shown in Figures 24, 25, and 26 are taken from a series of comparison tests between tires of this construction and standard construction, i.e., having carcass sidewalls of conventional bias cord fabric, a toroidal carcass configuration, standard breaker strips, and a tread deeply shouldered to provide a flat tread surface construction. The treads were of similarly compounded tread stock; inflation pressures were carefully maintained equal, and load, speed and other conditions were equalized over the period of the test. The difference in results, therefore, can be attributed only to the novel construction of tires made according to this invention. Figure 24 shows that, for a given depth of tread wear, tires made according to this invention will deliver approximately twice the mileage; in this case, the speeds were varied during the tests. When higher speeds are maintained, the increase in mileage delivered by this construction is even greater. Figure 25 shows that, for a given speed, the power consumption is much less; Figure 26 shows that, for a given cornering force, the slip angle is much less.

Figure 23:
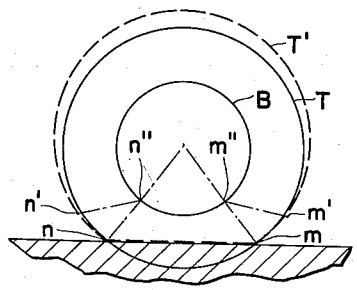
Fig. 23 is a diagram illustrating a possible explanation for the advantages secured by this invention.

There may be many and varying theories advanced to explain why a tire of this construction provides such increase in mileage and decrease in power consumption and slip angle, and this invention is not to be limited to any one theory or set of theories. One theory, however, which is believed to be correct from observable indications may be explained by reference to Fig. 23, in which the inner circle B represents the bead of the tire and the outer circle T represents the normal circular tread under inflation, but not under load. Under load, a tire, either conventional or one made according to this invention, flattens in its area of contact with the ground. In conventional tires, this flattening, from point $m$ to point $n$, compresses the tread, to the extent that the cord $m$—$n$ is shorter than the arc $m$—$n$. It is this compression (and expansion upon relief from compression) of the tread surface as it rolls in contact with the ground which is believed to abrade the tread and, thus, to constitute a major cause of tread wear. A tire made according to this invention likewise flattens in its area of contact with the ground when under load and, undoubtedly to a lesser degree, its tread likewise undergoes some abrading contraction and expansion. But, even though the cincture is relatively non-resistant to circumferential compression, the tension placed on the relatively inelastic cincture by inflation pressure resists compression (thus minimizing the abrasive expansion and contraction of the tread while rolling) by tending to maintain the peripheral length of the tread more nearly constant. The effect of maintenance of a more nearly constant peripheral length would be as illustrated in Fig. 23 by the dotted line T'. If the foregoing theory is correct, then also, as is evident from Fig. 23, the radial lines m—m'' and n—m'', when the tire is inflated but under no load, would become the non-radial lines m'—m'' and n'—n'' when the tire is under load. Stroboscopic pictures appear to confirm this peripheral flexing of the sidewalls.

Figure 6A:
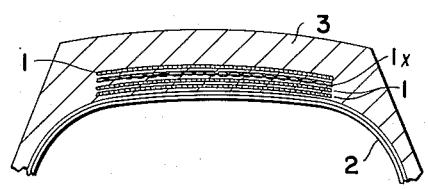
Figure 6a is a view similar to Figure 6, showing a further modification.

A consequence of the type of peripheral flexing of the sidewalls obtained with a tire constructed according to this invention is that, when the cords in the carcass and/or the cincture belt are of metal, such as steel wire, rather than natural or synthetic organic fibers, one may employ wire cords or formations in which the guage of the elemental wire in the cords is substantially greater than heretofore believed possible. That is, in a wire cord consisting of a plurality of wires twisted or wound about each other, the elemental wires may be as much as 0.35 to 0.4 mm. in diameter or more, as the tire may require and, in any event, not less than 0.2 mm. in diameter. Especially when employing metal wire cords in the cincture structure, it may be advantageous to construct the cincture with one or more transverse, axially extending layers of rubberized cords (textile or metallic) interposed between the layers of circumferentially extending metal cords which are parallel to the equatorial plane of the tire. Thus, as shown in Figure 6a, a layer of cross cords, i.e., the transverse axially extending cords 1X, is located between the circumferentially extending layers 1.

This invention, therefore, is not limited to the specific embodiments disclosed but is defined in accordance with the combinations and sub-combinations as hereinafter claimed.

What is claimed is:

1. A pneumatic tire casing for automotive vehicles which comprises in combination a pair of beads, a multiply carcass of rubberized cord fabric extending from bead to bead and extensible peripherally of the tire, the rubberized cords of said carcass being parallel to one another in each ply and being disposed substantially radially of the tire, the interior height of the carcass being smaller than the interior width thereof, sidewalls for the carcass, a crown for said carcass which is of relatively flat configuration transversely of the tire and is concentric with the axis of rotation of the tire, a tread mounted concentrically with said beads and carried by the sidewalls of the carcass, said tread being composed of a rubber compound having a high modulus, a ground-contacting surface for said tread which is concentric with the axis of rotation of the tire and is of relatively flat configuration transversely of the tire, the width of said ground-contacting surface being less than said interior width of said carcass, a cincture structure mounted wholly between said tread and said crown and having a width which is substantially equal to but not greater than that of the tread, said cincture being of relatively flat configuration transversely of the tire, substantially inextensible peripherally of the tire and flexible peripherally and transversely of the tire, a rubberized cord structure alone constituting said cincture structure, said rubberized cord structure comprising at least two layers of rubberized cords of low elongation properties, the cords in each layer being parallel to each other and forming an angle of from 0° to 20° with respect to the equatorial plane of the tire, said rubberized cord structure, when the cords of one layer form a given angle greater than 0° with respect to said equatorial plane, being provided with a complementary layer wherein the cords are inclined with respect to said equatorial plane at an angle equal but opposite to said given angle, said rubberized cords being rubberized with a rubber compound having a low modulus, said cincture structure being contractible under circumferential compression when the tire casing is devoid of inflation and being both inextensible and uncontractible when the tire casing is subjected to inflation.

2. A pneumatic tire casing according to claim 1, wherein said cincture structure comprises a plurality of substantially inextensible cincture structures.

3. A pneumatic tire casing according to claim 2, in which the cincture structures are concentrically disposed with respect to the axis of rotation of the tire and radially thereof with respect to each other.

4. A pneumatic tire casing for automotive vehicles comprising a carcass, said carcass comprising beads and layers of rubberized cords joining said beads, said cords being parallel to one another in the respective layers and being disposed substantially radially of the tire, a tread portion and sidewalls for the carcass, said tread portion being composed of a rubber compound having a high modulus; the cross sectional height of the casing from bead to tread portion not exceeding the cross sectional width thereof between the sidewalls, the tread portion being carried concentrically with said beads by said sidewall portions of said carcass, the lateral edges of said tread portion not extending beyond parallel planes tangential to the sidewalls of the carcass whereby the sidewalls are exposed, said tread portion having a substantially flat ground contacting surface about its circumference, and a substantially cylindrical inextensible cincture structure disposed wholly between the carcass and the tread portion and having a width which is substantially equal to but not greater than that of the tread portion, a rubberized cord structure alone constituting said cincture structure, at least two layers of rubberized parallel cords of low elongation characteristics constituting the said cord structure, all of said rubberized cords being rubberized with a rubber compound having a low modulus, the rubberized cords in each layer being parallel to one another and all the cords of said cord structure being inclined to the equatorial plane of the tire in a maximum of two directions which are symmetrical with respect to the equatorial plane of the tire at an angle of from 5° to 20°, said cincture structure being contractible under circumferential compression when the tire casing is devoid of inflation and both inextensible and uncontractible when the tire casing is subjected to inflation.

5. A pneumatic tire casing according to claim 4, in which the cincture structure is comprised of a strip of rubberized cord structure folded to provide at least a pair of layers.

6. A pneumatic tire casing according to claim 5, in which the folded edges of two strips of rubberized cord structure are oppositely disposed with respect to each other and the folded edge of one strip extends beyond the free edges of the other strip.

7. A pneumatic tire casing according to claim 4, in which the cincture structure comprises a strip of rubberized cord structure in which the margins of said strip are folded to provide parallel folded edges and said margins overlap each other.

8. A pneumatic tire casing according to claim 7, in which said strip of rubberized cord structure comprises a plurality of layers in which the cords are divergently disposed with respect to each other and to the length of said strip.

9. A pneumatic tire casing according to claim 7, including at least one reinforcing layer enclosed by said folded strip.

10. A pneumatic tire casing for automotive vehicles comprising a carcass, said carcass comprising beads and layers of rubberized cords joining said beads, said cords being parallel to one another in the respective layers and lying, at any given circumferential point along the carcass, at an angle, which is substantially the same in all of the layers, between 80° and 90° to a plane perpendicular to the rotational axis of the tire, a tread portion and sidewalls for the carcass, said tread portion being carried concentrically with said beads by said sidewall portions of said carcass, said tread portion being confined between parallel planes tangential to the sidewalls of the tire carcass whereby the sidewalls are exposed, said tread portion having a substantially flat ground-contacting surface about its circumference, and a substantially cylindrical cincture structure disposed wholly between the carcass and the tread portion and having a width which is substantially equal to but not greater than that of the tread portion, said cincture structure comprising at least one band having at least two superimposed layers of rubberized textile cords of low elongation, the cords in each layer being parallel to one another with the cords of one layer lying at any given point in a diagonal direction and at an angle of not greater than 20° to said plane perpendicular to the rotational axis of the tire, the cords of a second layer extending at substantially the same angle as those of the first said layer but in a direction opposite to that of the cords of the first layer, and the cross-sectional height of the casing from bead to tread not exceeding the cross-sectional width thereof between the sidewalls whereby in the inflated condition of the tire the cincture structure is under tension to maintain said tread portion in said substantially flat condition and minimize expansion and contraction of the tread in its area of contact with the ground during rolling, a portion of a layer of said cincture structure being folded back on the rest of said cincture structure so as to lie face-to-face thereagainst.

11. A pneumatic tire casing for automotive vehicles comprising a carcass, said carcass comprising beads and layers of rubberized cords joining said beads, said cords being parallel to one another in the respective layers and lying, at any given circumferential point along the carcass, at an angle, which is substantially the same in all of the layers, between 80° and 90° to a plane perpendicular to the rotational axis of the tire, a tread portion and sidewalls for the carcass, said tread portion being carried concentrically with said beads by said sidewall portions of said carcass, said tread portion being confined between parallel planes tangential to the sidewalls of the tire carcass whereby the sidewalls are exposed, said tread portion having a substantially flat ground-contacting surface about its circumference, and a substantially cylindrical cincture structure disposed wholly between the carcass and the tread portion and having a width which is substantially equal to but not greater than that of the tread portion, said cincture structure comprising at least one band having at least two superimposed layers of rubberized textile cords of low elongation, the cords in each layer being parallel to one another with the cords of one layer lying at any given point in a diagonal direction and at an angle of not greater than 20° to said plane perpendicular to the rotational axis of the tire, the cords of a second layer extending at substantially the same angle as those of the first said layer but in a direction opposite to that of the cords of the first layer, and the cross-sectional height of the casing from bead to tread not exceeding the cross-sectional width thereof between the sidewalls whereby in the inflated condition of the tire the cincture structure is under tension to maintain said tread portion in said substantially flat condition and minimize expansion and contraction of the tread in its area of contact with the ground during rolling, said cincture structure being comprised of a plurality of said bands axially adjacent within said structure.

12. A pneumatic tire casing for automotive vehicles comprising a carcass, said carcass comprising beads and layers of rubberized cords joining said beads, said cords being parallel to one another in the respective layers and lying, at any given circumferential point along the carcass, at an angle, which is substantially the same in all of the layers, between 80° and 90° to a plane perpendicular to the rotational axis of the tire, a tread and sidewalls for the carcass, said tread portion being carried concentrically with said beads by said sidewall portions of said carcass, said tread portion being confined between parallel planes tangential to the sidewalls of the tire carcass whereby the sidewalls are exposed, said tread portion having a substantially flat ground-contacting surface about its circumference, and a substantially cylindrical cincture structure disposed wholly between the carcass and the tread portion and having a width which is substantially equal to but not greater than that of the tread portion, said cincture structure comprising at least one band having at least two superimposed layers of rubberized textile cords of low elongation, the cords in each layer being parallel to one another with the cords of one layer lying at any given point in a diagonal direction and at an angle of not greater than 20° to said plane perpendicular to the rotational axis of the tire, the cords of a second layer extending at substantially the same angle as those of the first said layer but in a direction opposite to that of the cords of the first layer, and the cross-sectional height of the casing from bead to tread not exceeding the cross-sectional width thereof between the sidewalls whereby in the inflated condition of the tire the cincture structure is under tension to maintain said tread portion in said substantially flat condition and minimize expansion and contraction of the tread in its area of contact with the ground during rolling, the lateral edges of the layers in the band being folded back against the band.

13. In a pneumatic tire casing, a pair of beads, a multi-ply carcass of rubberized cord fabric extending from bead to bead, a tread carried concentrically with said beads by sidewall portions of said carcass, said sidewalls being relatively more flexible than said tread portion, said carcass having an interior height less than its interior width from sidewall to sidewall, and said tread having a relatively flat, substantially cylindrical ground-contacting surface of a width less than said interior width of said carcass from sidewall to sidewall, a cincture structure non-resistant to circumferential compression and of substantially cylindrical configuration located between said tread and said carcass, said cincture structure comprising a plurality of bands concentrically disposed with respect to the axis of rotation of the tire and radially thereof with respect to each other, each band comprising at least one layer of rubberized cord fabric of low elongation characteristics, said cords being parallel with each other in any given layer and extending at an angle ranging from 0° to 20°, with respect to the equatorial plane of the tire, the cords in adjacent layers being divergently disposed if said angle is substantially greater than 0°, whereby, when said tire casing is under inflation, said cincture is under tension and resists compression by tending to maintain the peripheral length of the said tread constant, each of said bands being comprised of rubberized cord fabric folded to provide at least a pair of plies.

14. A tire casing as defined in claim 13 in which the folded edges of said bands are oppositely disposed with respect to each other and an unfolded edge of one ply in the band extends beyond an unfolded edge of another ply, whereby the edges of the plies in the cincture structure are stepped-off with respect to each other.

15. A pneumatic tire casing according to claim 14, and including a first breaker strip of bias cord fabric located between the tread and said cincture structure and a second breaker strip of bias cord fabric located between said cincture structure and said carcass.

16. In a pneumatic tire casing, a pair of beads, a multi-ply carcass of rubberized cord fabric extending from bead to bead, a tread carried concentrically with said beads by sidewall portions of said carcass, said sidewalls being relatively more flexible than said tread portion, said carcass having an interior height less than its interior width from sidewall to sidewall, and said tread having a relatively flat, substantially cylindrical ground-contacting surface of a width less than said interior width of said carcass from sidewall to sidewall, a cincture structure non-resistant to circumferential compression and of substantially cylindrical configuration located between said tread and said carcass, said cincture structure comprising at least one band of at least one layer of rubberized cord fabric of low elongation characteristics, said cords being parallel with each other in each layer and extending at an angle ranging from 0° to 20°, with respect to the equatorial plane of the tire, whereby, when said tire casing is under inflation, said cincture is under tension and resists compression by tending to maintain the peripheral length of the said tread constant, said band being comprised of a strip of said cord fabric wherein the margins of said fabric are folded to provide parallel folded edges and wherein said margins overlap each other.

17. A tire casing as defined in claim 16 in which said strip of cord fabric is comprised of a plurality of plies in which the cords are divergently disposed with respect to each other and to the length of said strip.

18. A tire casing as defined in claim 16 including at least one reinforcing ply enclosed by said folded strip.

19. A pneumatic tire casing for automotive vehicles comprising a carcass, said carcass comprising beads and layers of rubberized cords joining said beads, said cords being parallel to one another in the respective layers and being disposed substantially radially of the tire, a tread portion and sidewalls for the carcass, said tread portion being composed of a rubber compound having a high modulus, the cross-sectional height of the casing from bead to tread portion not exceeding the cross-sectional width thereof between the sidewalls, the tread portion being carried concentrically with said beads by said sidewall portions of said carcass, the lateral edges of said tread portion not extending beyond parallel planes tangential to the sidewalls of the carcass whereby the sidewalls are exposed, said tread portion having a substantially flat ground-contacting surface about its circumference, and a substantially cylindrical inextensible cincture structure disposed wholly between the carcass and the tread portion and having a width which is substantially equal to but not greater than that of the tread portion, said cincture structure comprising a layer of rubberized parallel cords of low elongation characteristics parallel to one another and substantially parallel to the equatorial plane of the tire, all of said rubberized cords being rubberized with a rubber compound having a low modulus, said cincture structure being contractible under circumferential compression when the tire casing is devoid of inflation and both inextensible and uncontractible when the tire casing is subjected to inflation.

20. In a pneumatic tire casing, a carcass, said carcass consisting of a plurality of layers of rubberized cords arranged in parallel planes which lie at an angle, which is substantially the same in all of the layers, of not less than 80° to a plane perpendicular to the rotational axis of the tire, a tread portion carried on said carcass and having a substantially flat ground-contacting surface and a plurality of substantially inextensible breaker belts disposed side by side between the carcass and the tread portion and each lying substantially parallel to said ground-contacting surface, the belted portion of the casing being substantially coextensive in width with the tread portion, the edges of each breaker belt being folded back on the rest of the belt so as to lie face to face thereagainst with the ratio of the combined width of the two folds formed by the folding of the edges to the overall width of the folded belt increasing from belt to belt outwardly from the center belt, each breaker belt consisting of at least two separate superimposed layers of rubberized textile fiber cords arranged with the cords in each layer parallel to one another and at any given point along the belt circumferentially thereof at an angle of not less than 70° to a radial plane passing through said point and containing the rotational axis of the tire.

21. A pneumatic tire casing according to claim 20 in which the combined width of the folds of each of the two outermost belts is substantially equal to the overall width of the folded belt.

22. A pneumatic tire casing according to claim 20 in which the cords of the breaker belt structure each have an angle of inclination of less than 10° with respect to a plane perpendicular to the rotational axis of the tire.

23. A pneumatic rubber tire casing comprising a carcass interiorly reinforced with an all-metal reinforcement consisting of at least two layers of metal wire formations embedded in the rubber of the casing, said metal wire formations being disposed in juxtaposition and also parallel relation to one another in the respective layers and in the case of each layer being disposed in planes which are substantially radial to the tire; a tread mounted on the carcass in integral connection therewith; and a substantially cylindrical breaker structure interposed between the tread and the carcass, said breaker structure consisting of at least two layers of metal wire formations also embedded in the rubber of the casing and also disposed in juxtaposition and parallel relation to one another in the respective layers, said metal wire formations of the layers forming the breaker structure being disposed in the case of each layer in planes which are substantially parallel to the equatorial plane of the tire, the breaker structure having a width dimension cross-sectionally of the casing which is not greater than that of the tread, the over-all width dimension of the casing cross-sectionally thereof being greater than the over-all height dimension, and the metal wire formations of all of the layers thereof, both of the carcass reinforcement and also of the breaker structure, being composed solely of a plurality of elementary wires wound about one another to the form of a unitary structure and having a diameter not less than 0.2 mm.

24. A pneumatic rubber tire casing according to claim 23, said casing having at least one layer of textile cords embedded in the rubber of the casing in juxtaposition and also parallel relation to one another in the layer, said layer of textile cords having substantially the same width cross-sectionally of the casing as the layers of metal wire formations forming the breaker structure and being arranged between these last mentioned layers in alternate sequence therewith, with the cords at right angles to the metal wire formations of said last mentioned layers.

25. A pneumatic tire casing according to claim 23, said casing having at least one additional layer of metal wire formations embedded in the rubber of the casing in juxtaposition and also parallel relation to one another in the layer, said additional layer having substantially the same width cross-sectionally of the casing as the layers of metal wire formations forming the breaker structure and being arranged between these last mentioned layers in alternate sequence therewith, with the metal wire formations of the additional layer at right angles to those of said last mentioned layers.

References Cited in the file of this patent
UNITED STATES PATENTS

| | | |
|---|---|---|
| 1,188,062 | Gammeter | June 20, 1916 |
| 1,554,370 | Renner | Sept. 22, 1925 |
| 1,779,391 | Darrow | Oct. 21, 1930 |
| 2,493,614 | Bourdon | Jan. 3, 1950 |
| 2,811,998 | Bourdon | Nov. 5, 1957 |